Feb. 27, 1951   N. MARCHAND   2,543,034
EARTH INDUCTOR COMPASS INDICATING SYSTEM
Filed Aug. 21, 1945

INVENTOR.
NATHAN MARCHAND
BY
*R P Morris*
ATTORNEY

Patented Feb. 27, 1951

2,543,034

UNITED STATES PATENT OFFICE 2,543,034

EARTH INDUCTOR COMPASS INDICATING SYSTEM

Nathan Marchand, New York, N. Y., assignor to Federal Telephone and Radio Corporation, New York, N. Y., a corporation of Delaware Application August 21, 1945, Serial No. 611,889

2 Claims. (Cl. 33—204)

This invention relates to a compass indicator and more particularly to an indicator for a compass of the earth inductor type.

Compasses of the type in which a coil is rotated in the earth's magnetic field thereby generating a current which may be compared with some standard for indicating magnetic north are well known. These compasses are generally termed earth inductor compasses. Many types of indicator systems have been suggested for producing the desired north-south indications. However, in general, such systems fail to provide means whereby the sense of the north-south direction may be readily obtained on an instantaneous type of indicator.

It is an object of my invention to provide an indicating system using a rotatable conductive means rotated at a predetermined rate in a magnetic field in which an indicator means is synchronized with the rotation of the pick-up means and the output of the pick-up means is rectified and applied to an indicator, one portion of the rectified energy being distorted to provide a sense indication.

It is a further object of my invention to provide an earth inductor compass including, on a rotatable pick-up coil, a selective filter means, a rectifier means and a cathode ray indicator in which a common drive means is provided simultaneously to drive the rotatable coil and the deflecting system of the cathode ray indicator.

It is a still further object of my invention to provide in an earth inductor compass as outlined above, means for distorting or effectively suppressing certain half cycles of the wave to be rectified so that a sense of the directional indication may be obtained.

Figure 1:
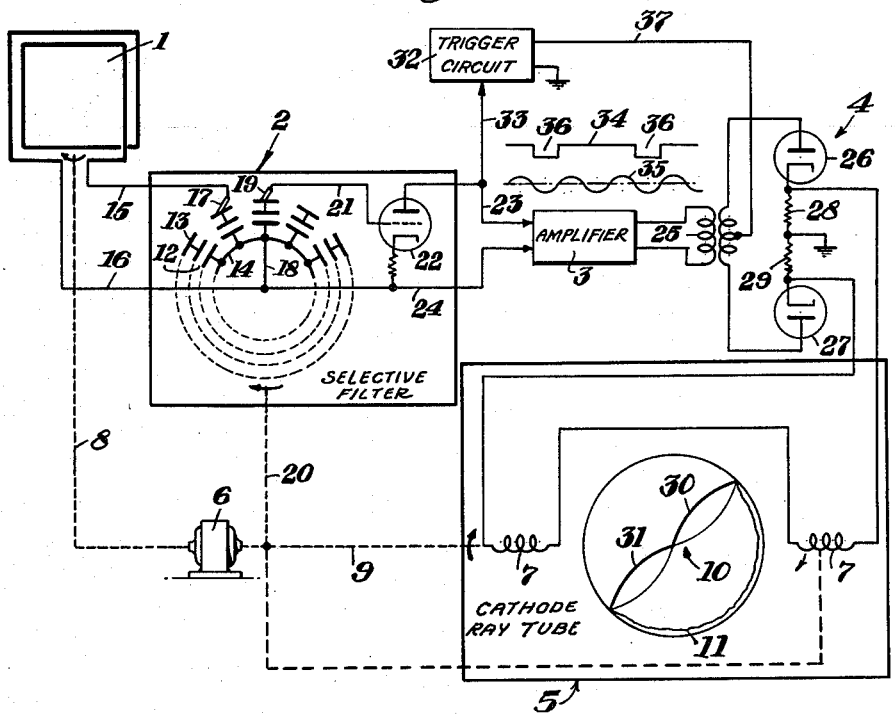
Figure 2:
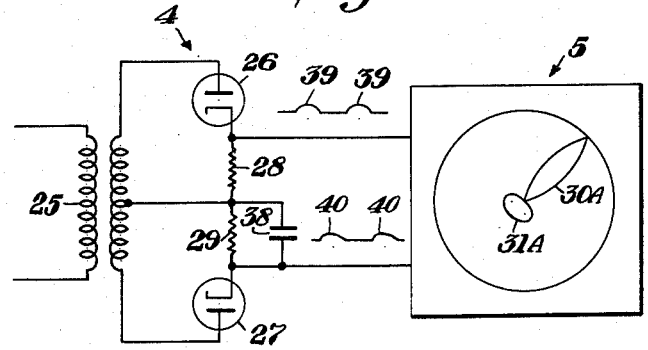

A better understanding of my invention and the objects and features thereof may be had from the particular description thereof made with reference to the accompanying drawing, in which:

Fig. 1 is a schematic circuit diagram partly in block illustrating an indicating system in accordance with my invention; and Fig. 2 is an alternative indicator arrangement which may be used with the system of Fig. 1.

The earth inductor compass as shown in Fig. 1 comprises essentially a rotatable loop or pick-up coil 1 which may be preferably provided with a permeable iron core. Pick-up coil 1 is coupled to a selective filter means 2 which serves to select only the fundamental wave produced in the rotation of loop 1 to the exclusion of extraneous fields. The output of filter 2 is coupled over an amplifier 3 and rectifier 4 to an indicator 5 which may be of the cathode ray type. A motor 6 serves simultaneously to drive coil 1 and ray deflecting means 7 over shafts 8 and 9. The output from rectifier 4 is also supplied to coils 7 producing a direction indicating pattern 10 on the screen 11 of indicator 5.

Filter 2 is preferably made extremely selective and as illustrated in Fig. 1 may comprise a synchronous filter of the type disclosed more fully in the copending application of G. R. Clark, Serial No. 591,894, filed May 4, 1945, which has become abandoned. This filter comprises essentially a plurality of storage condensers 12 connected on one side of a plurality of the contact terminals 13 and on the other side to a common bus 14. Output leads 15 and 16 from loop 1 are coupled to terminals 13 and common bus 14 respectively, by brush 17 and lead 18. An output brush 19 serves to take off energy stored in condensers 12. The rotatable condenser bank and brushes 17 and 19 are rotated relatively to one another at the same speed as loop 1 is rotated, for example by shaft 20 from motor 6. Since the relative rotation of the condensers 12 is synchronous with rotation of loop 1, a charge will tend to build up in these condensers depending upon the voltage applied thereto from loop 1. Because only regularly produced waves will be synchronously repeated, only these regular waves will cumulatively charge the condensers 12.

The output voltage from the condensers 12 is taken over brush 19 and lead 21 to a coupling tube 22. The output voltage from tube 22 may be applied over lead 23 to the input of amplifier 3, the cathode lead 24 also being coupled to this amplifier. The output of amplifier 3 is coupled over transformer 25 to the rectifiers 26 and 27 of rectifier means 4. In the cathode lines of rectifiers 26 and 27 are provided output resistors 28 and 29 respectively, which are coupled to coils 7 of indicator 5. It will be evident that a full wave rectified sine voltage is thus applied to deflection coils 7. The indicator 5 preferably has its beam so biased that at a zero signal level it will be at the outer edge of the screen. An increase in deflecting voltage in coils 7 will tend to deflect this beam toward the center.

If the entire full-wave rectified voltage were applied, the two lobes 30 and 31 of pattern 10 would appear on the screen at equal brilliance and it would not be possible to tell which is north and which is south. In order to obtain a sense indication, I provide a trigger circuit 32, as for example a one shot multivibrator circuit coupled over lead 33 to the output of filter 2. This trigger circuit is biased to produce an output wave as shown at 34 synchronized with the output wave 35 from filter 2 so that negative pulses 36 are produced coinciding with alternate negative half wave cycles of wave 35. The output wave 34 is applied over lead 37 to rectifiers 26 and 27 serving to block rectification for alternate negative half waves. As a consequence, on the screen of the cathode ray tube the pattern 30 which represents the positive half wave cycles will appear more brilliant than the part of the pattern 31 which represents the negative half waves.

While in Fig. 1, I have shown an indicator using a trigger circuit for distorting the output wave by suppression of certain half wave cycles thereof, a sensing indication may be provided simply by distorting the shape of one of the half wave cycles of the output wave. A circuit for accomplishing this result is shown in Fig. 2. According to this arrangement, output transformer 25 is coupled to rectifiers 26 and 27 in the same manner as in Fig. 1. However, one of the cathode resistors, for example cathode resistor 29, is shunted by a condenser 38. As a consequence, the output pulses for the positive half cycle will be as illustrated at 39 but for the negative half cycle as shown at 40 they will not reduce to zero. Thus, on indicator 5, a pattern will be traced having a lobe 30a representing the direction and a substantially suppressed lobe 31a representing the other side of the arrow. This form of indication may be preferable to that shown in Fig. 1 since there is no possibility of error in reading the indication.

While I have described my invention in accordance with a particular embodiment and particular modification thereof, it should be distinctly understood that this is given merely by way of example. Many variations in the system in accordance with my invention will readily occur to those skilled in the art. It should therefore be clear that the description of the particular examples is made merely as illustrative and not as any limitation on the scope of my invention as set forth in the objects thereof and in the appended claims.

I claim:

1. An indicating system for indicating the direction of a magnetic field, comprising a rotatable pick-up coil, a rotary condenser filter means, a rectifier means, a cathode ray indicator having rotary deflecting means, means coupling said coil and said rectifier means to said rotary filter means, common means for simultaneously driving said pick-up coil, rotary filter and deflecting means, and means for applying the output of said rectifier to said deflecting means.

2. An indicating system for indicating the direction of a magnetic field, comprising a rotatable pick-up coil, a rotary condenser filter means, a two tube, full wave rectifier means, a cathode ray indicator having rotary deflecting means, means coupling said coil and said rectifier means to said rotary filter means, common means for simultaneously driving said pick-up coil, rotary filter and deflecting means, distorting means shunting the output of one of said rectifier tubes, and means for applying the output of said rectifier to said deflecting means.

NATHAN MARCHAND.

REFERENCES CITED

The following references are of record in the file of this patent:

UNITED STATES PATENTS

| Number | Name | Date |
|---|---|---|
| 2,130,912 | Tolson | Sept. 20, 1938 |
| 2,261,309 | Stuart | Nov. 4, 1941 |
| 2,263,377 | Busignies et al. | Nov. 18, 1941 |
| 2,373,096 | Bonell | Apr. 10, 1945 |
| 2,440,268 | Hardy | Apr. 27, 1948 |
| 2,489,279 | Finzer | Nov. 29, 1949 |

FOREIGN PATENTS

| Number | Country | Date |
|---|---|---|
| 9,912 | Great Britain | May 1, 1903 |
| 468,918 | Great Britain | July 15, 1937 |